UNITED STATES PATENT OFFICE.

DE LAGNEL HAIGH, OF ST. LOUIS, MISSOURI.

COMPOSITION OF MATTER FOR PLASTER.

SPECIFICATION forming part of Letters Patent No. 433,861, dated August 5, 1890.

Application filed December 24, 1889. Serial No. 334,828. (No specimens.)

*To all whom it may concern:*

Be it known that I, DE LAGNEL HAIGH, a citizen of the United States, residing at St. Louis, in the State of Missouri, have invented a new and useful Composition of Matter for Plaster for Covering Walls and for other Architectural Purposes; and I do hereby declare the following to be a clear, full, and exact description of the same, such as will enable others skilled in the art to which it appertains to use my invention.

The object of my invention is to make a wall-plaster that is hard, tenacious, of great tensile strength and durability, and which may at the same time be cheaply manufactured and easily worked, and to obviate the use of acids or any substances in solution or any liquid other than water in its manufacture.

The advantages of my composition consist in the mixture of its compound parts in a dry state and preserving the same in this state till just before the application of the plaster to the wall, at which time, by the addition to my composition of water in the presence of calcined sulphate of calcium, carbonate of lime, lime, clay, and (for the rough coat alone) sand, the chemical operation hereinafter mentioned is initiated.

The chemical action resulting from the exchange of those elements in the component parts of my composition which have a chemical affinity for each other, and on which chemical action my composition depends for its valuable qualities, is thus delayed until just as the plaster is ready to apply to the wall, and is not completed until after the plaster is so applied. By these means a plaster is made of a different chemical constitution than can be otherwise formed and possessing in a greater degree than any other the quality of being hard, tenacious, durable, and strong, as well as imperviousness to moisture and of being also unaffected by heat.

In the compounding of my composition, I make use of the principle of chemistry, that whenever soluble sulphates—more particularly those of iron, zinc, copper, and the alkalies—are brought into contact with bases forming insoluble sulphates, (especially the base calcium, preferably in the form of a hydrate, $Ca(OH)_2$, such as slaked lime, or the oxide of calcium, $(CaO,)$ such as unslaked lime, or calcium carbonate $(CaCo_3)$—as, for example, marble-dust, limestone, &c.,) these different forms of the base being preferably in a state of powder, insoluble salts or sulphates are formed. I have mentioned the base calcium, but a like result will follow if any of the other known bases capable of forming insoluble sulphates are used. I preferably mix with such ingredients other substances, as hereinafter mentioned, for the purpose of imparting to the plaster certain desirable qualities and characteristics. When to this composition, as above stated, water is added in the presence of calcined sulphate of calcium, carbonate of lime, lime, clay, and (for the rough coat) sand also, just previous to the application of the plaster to the wall, the chemical action above specified is started into operation, and it is completed after the plaster is spread on the wall.

Plaster prepared with my composition and according to my invention will dry in any kind of weather, and sets very quickly, making a hard, stone-like substance. The setting of the plaster, unless checked, is so rapid that it is desirable in wall-plasters to combine in the composition a set-back in order to retard such setting. I sometimes add to my composition the following specific substances: dextrine, glucose, sugar, starch, borax, &c., as I have found that when applied in connection with these substances certain desirable qualities are imparted to the plaster. Glue may also be used with the composition. Plaster which is thus formed is much more easily applied to walls than common plaster made of a mixture of lime and sand with water. It cannot freeze in winter, as common plaster does, and possesses a great degree of adhesiveness to laths, wood, brick, stone, and even metal surfaces, beyond any similar composition. It is also, as stated above, to a greater degree than any other like material impervious to moisture and unaffected by heat.

I may use my composition either in the preparation of plasters for rough or base coats on walls, or in the preparation of white or finishing coats.

In compounding my composition for use in plasters for rough or base coats, I take about one-half pound of dextrine of good quality, about one pound of crystallized sulphate of iron—I prefer ferrous sulphate (Fe SO₄7H₂O)—about one pound biborate of sodium (Na₂B₄O₇.10H₂O) and dissolve each separately in as small a quantity of soft water as possible. I next mix these three solutions and add about five pounds of finely-powdered furnace-slag or other silicate, and then thoroughly mix the whole mass and dry the same at a slow heat on the water-bath or in any other suitable way, and when dry I reduce the mixture to a fine powder. Next, I dissolve about ten pounds of glue or other equivalent substance in a sufficient quantity of warm water to form a thick paste, and add about ten pounds of finely-powdered carbonate of lime (CaCO₃). This I thoroughly mix and dry at a slow heat on the water-bath, or in any other suitable way, and reduce this mixture also to a fine powder, and I then mix this powder with the other powder above mentioned. I may use one or more of these adjunctive ingredients with my composition.

In the compounding of my composition any other known soluble sulphates—such as those of zinc, copper, or any of the alkalies—may be used instead of the sulphate of iron above specified, with equal effect, the quantity used being varied according to the ingredient employed, and as will suggest itself to any one skilled in the art. The sulphate of iron is preferred only on account of its cheapness. In the same way any silicate may be used in place of the furnace-slag, the quantity being substantially the same.

When water is mixed with the above composition in the presence of calcined sulphate of calcium, carbonate of lime, lime, clay, and (for the rough coat alone) sand, the principal chemical action takes place, and the leading one in my invention will be represented by the following formula, where the base calcium is used:

$$Ca(OH)_2 + FeSO_4.7H_2O = CaSO_4 + Fe(OH)_2 + 7H_2O.$$

The other ingredients in my composition do not play as important a part therein, but impart certain desirable qualities to the plaster, as specified herein. The calcium sulphate, which is very hard and insoluble, forms throughout the entire mass after the plaster is applied to the wall, and unites the whole mass together into one insoluble stone-like substance. The dextrine serves to keep the set back, and thus to make the plaster work smoothly, and at the same time strengthens the plaster. The action of the sulphate of iron has been fully explained—viz., to unite with the hydrate and carbonate of lime to form the insoluble calcium sulphate. Borax acts to some extent like the silicate in slags, hardening the plaster by forming borates with the bases present. The furnace slag or silicate acts to harden the plaster, and is one of the bases of the plaster, silica being seven in the scale of hardness. Glue acts to cement the different ingredients into a concrete mass and to hold the chemical combinations together after they are formed. It also acts to keep the set back. The carbonate of lime acts partially to unite with the soluble sulphate of iron and partially with the biborate of sodium. It also assists in making the plaster harder. Sugar and glucose act to keep the set back and to make the plaster work more smoothly.

Instead of the calcium carbonate I may use calcium hydrate (Ca(OH)₂), slaked lime, or calcium oxide (CaO), unslaked lime, or any other substances capable of forming insoluble sulphates.

As has been stated, the previous composition is intended to be used with calcined sulphate of calcium, carbonate of lime, lime, clay, and sand in the manufacture of plaster for rough coats or base coats. The calcined sulphate of calcium, carbonate of lime, and the other substances mentioned are added to my composition in order to give body and bulk to the plaster. They are not essential to the chemical action above described; but this chemical action when instituted extends through the entire body of the plaster.

For the white or finishing coat I make a composition as follows: Stir five pounds of starch into a boiling solution of five pounds of borax and one-half pound of sulphate of copper (CaSO₄.7H₂O) in five gallons of water. Boil until the starch is thoroughly gelatinized. Mix with this fifteen pounds of silica, dry at a low temperature on the water bath, or in any other suitable way, and reduce the composition to a fine powder.

I may also use for such white coat the following composition: Dissolve five pounds of dextrine in the least possible quantity of warm water. Add one-half pound of sodium sulphate, one-half pound of sulphate copper, and five pounds of borax. Stir well until dissolved, and gradually add ten pounds of finely-powdered silica. Dry at a slow heat on the water-bath, or in any other suitable way, and when dry reduce the mixture to a fine powder.

The white-coat-finish composition may also be compounded as follows: Take two pounds of sulphate of zinc and dissolve in a small quantity of water. Dissolve separately five pounds of borax and one pound of sugar, each in a small quantity of water. Mix the solutions and stir well. Sprinkle into this fifteen pounds of silica, finely powdered, and dry on the water-bath, or in any other suitable way, at a gentle heat, and when dry make into a fine powder.

When to either of the compositions above specified for the white coat water is added in the presence of calcined sulphate of calcium, carbonate of lime, lime, and clay, precisely the same chemical action takes place as already described of the composition for rough or base coats, and the white coat is, like the other, hard, tenacious, durable, and strong, little affected by either heat or moisture, and is at the same time easily and rapidly worked under the trowel, white, and capable of taking on a high polish.

I am aware that it is not new to apply solutions of various substances to plaster, gypsum, stucco, terra-cotta, and other analogous porous and frangible materials, and even to treat plaster with solutions of sulphates whose bases are precipitated in an insoluble form by the plaster, and I do not broadly claim the same herein.

My composition being in a dry state, plaster can be made with it as easily as it is made by the common method with lime. No solutions of any substances are necessary.

I do not wish to limit myself to the exact quantities specified above, nor to the exact substances specified, nor do I wish to confine my patent to the specific mode of operation described and the qualities ascribed to the various ingredients used herein, as such ingredients may possibly operate differently than in the manner stated.

What I claim, and desire to secure by Letters Patent, is—

1. As an improved compound for admixture with lime, &c., in the formation of plaster, fine silicious material having its particles coated with soluble sulphates, substantially as and for the purposes specified.

2. As an improved dry compound for admixture with lime or its equivalent to develop insoluble sulphates in plaster, finely-pulverized silicious material, such as furnace-slag, coated with a soluble sulphate and biborate of sodium, substantially as and for the purposes specified.

3. As an improved dry compound for admixture with lime or its equivalent to slowly develop insoluble sulphates in plaster, finely-pulverized silicious material, such as furnace-slag, coated with a soluble sulphate and biborate of sodium, and a retarder, such as dextrine, substantially as and for the purposes specified.

4. The method herein described for preparing a dry compound to be added to plaster compounds containing lime to form insoluble sulphates, which consists in forming a solution which contains a soluble sulphate, saturating finely-divided silicious material with said solution and evaporating the moisture at a low heat to produce a dry silicious mass having its particles coated with soluble sulphates, &c., substantially as and for the purposes specified.

DE LAGNEL HAIGH.

Witnesses:
JOHN W. DRABELLE,
JOHN E. BRADLEY.